United States Patent [19]

Aandewiel

[11] Patent Number: 5,728,273
[45] Date of Patent: Mar. 17, 1998

[54] METHOD AND INSTALLATION FOR BRINGING A GAS AND A LIQUID INTO CONTACT WITH ONE ANOTHER

[76] Inventor: Leendert Aandewiel, Ebstroom 10, NL-2221 WC Katwijk, Netherlands

[21] Appl. No.: 583,056

[22] PCT Filed: Aug. 9, 1994

[86] PCT No.: PCT/NL94/00187

§ 371 Date: Jan. 19, 1996

§ 102(e) Date: Jan. 19, 1996

[87] PCT Pub. No.: WO95/04581

PCT Pub. Date: Feb. 16, 1995

[30] Foreign Application Priority Data

Aug. 9, 1993 [NL] Netherlands ............ 9301382

[51] Int. Cl.$^6$ ........................................ B01D 3/34
[52] U.S. Cl. .................... 203/49; 202/189; 202/236; 159/13.3; 159/28.6; 159/49
[58] Field of Search .................... 159/13.3, 16.1, 159/28.6, 49; 202/188, 189, 236; 203/10, 49, 88

[56] References Cited

U.S. PATENT DOCUMENTS

| 3,738,410 | 6/1973 | Ricca et al. ............ 159/28.6 |
| 4,329,205 | 5/1982 | Tsumura et al. ............ 159/28.6 |
| 4,731,159 | 3/1988 | Porter et al. ............ 159/28.6 |
| 5,096,543 | 3/1992 | Elmore ............ 202/189 |
| 5,195,578 | 3/1993 | Le Goff et al. ............ 159/13.3 |
| 5,417,805 | 5/1995 | Rosenblad ............ 159/28.6 |
| 5,453,165 | 9/1995 | Bachman ............ 202/189 |

FOREIGN PATENT DOCUMENTS

| 601554 | 3/1926 | France. |
| 2 298 359 | 8/1976 | France. |
| 93 05 643 | 8/1993 | Germany. |
| 296 652 | 5/1954 | Switzerland. |
| 569143 | 5/1945 | United Kingdom. |
| WO 88/06054 | 8/1988 | WIPO. |
| WO 91/11670 | 8/1991 | WIPO. |

*Primary Examiner*—Peter A. Hruskoci
*Assistant Examiner*—Theodore M. Green
*Attorney, Agent, or Firm*—Young & Thompson

[57] ABSTRACT

Method for bringing a gas and a liquid into contact with one another, the liquid being passed in the form of a film over an evaporator surface (1) provided with small openings and the gas being fed through the openings in the evaporator surface, which gas mixes with the liquid on the surface and absorbs vapor from the liquid, a liquid subsequently being passed in the form of a film over a condenser surface (11) provided with small openings and the gas which has absorbed vapors from the liquid film on the evaporator surface being fed through the openings in the condenser surface, at least some of the absorbed vapor condensing and being carried along with the liquid film on the condenser surface and removed.

9 Claims, 2 Drawing Sheets

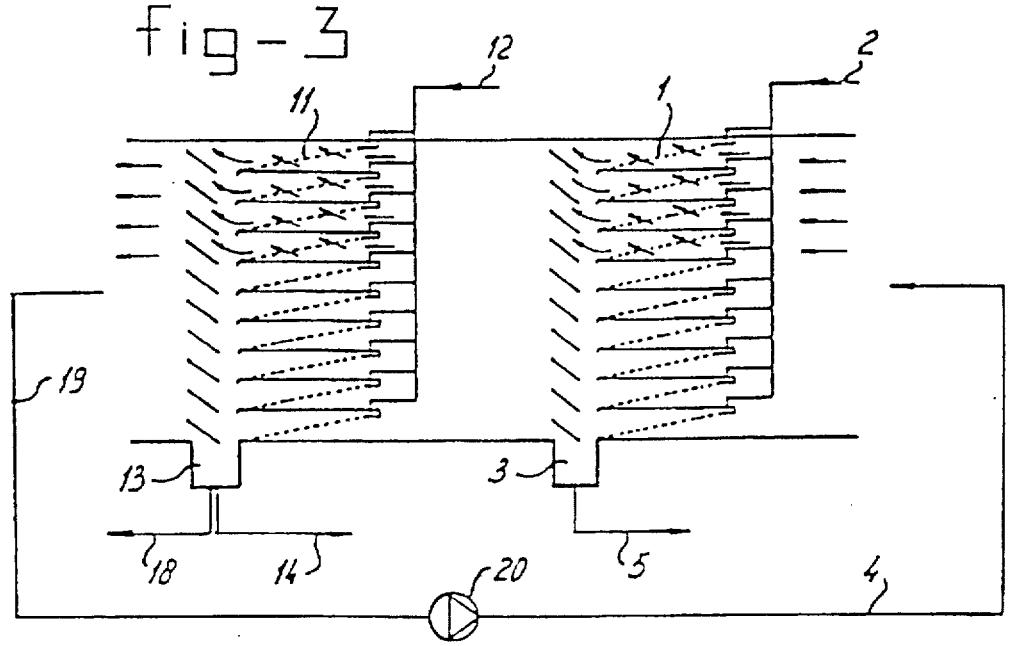
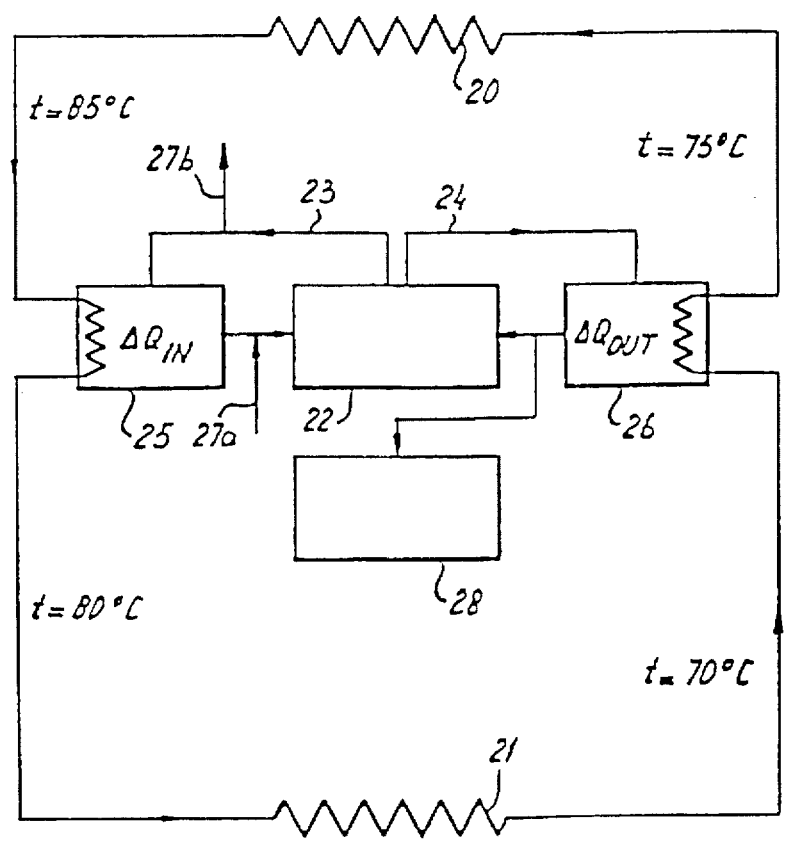

METHOD AND INSTALLATION FOR BRINGING A GAS AND A LIQUID INTO CONTACT WITH ONE ANOTHER

FIELD OF THE INVENTION

The invention primarily relates to a method for bringing a gas and a liquid into contact with one another, the liquid being passed in the form of a film over an evaporator surface provided with small openings and the gas being fed through the openings in the evaporator surface, which gas mixes with the liquid on said surface and absorbs vapour from said liquid.

BACKGROUND OF THE INVENTION

A method of this type is disclosed in FR-A-2298359. With this method evaporation of the liquid takes place. Compared with conventional vacuum evaporators, with which a medium to be heated is brought into heat exchange with a medium flowing through tubes and reduced pressure is created in the chamber in which the medium to be heated is located, the advantages achieved with the aid of the method according to the above-mentioned French Patent Application are that the installation is lighter in weight, that there is less maintenance, that no expensive control equipment susceptible to malfunctioning is required, that highly trained personnel are not needed to keep the installation in operation, that the yield is high in relation to the price, the weight and the capacity of the installation and that the temperature of the hot medium has to be only slightly above the heating temperature in order to achieve an adequate yield. In fact, use can be made of isentropic low-value energy, which is readily available.

The aim of the present invention is to supplement the above-mentioned known method in such a way that said method can be used for desilting, purification and distillation of liquid.

SUMMARY OF THE INVENTION

According to the invention, the method mentioned in the preamble is, to this end, characterized in that a liquid is subsequently passed in the form of a film over a condenser surface provided with small openings and in that the gas which has absorbed vapours from the liquid film on the evaporator surface is fed through the openings in the condenser surface, at least some of the absorbed vapour condensing and being carried along with the liquid film on the condenser surface and removed.

Preferably, the gas to be fed through the openings in the evaporator surface is at a lower temperature than the liquid on the evaporator surface and the liquid which flows off the evaporator surface is heated and returned to the evaporator surface.

As a consequence of the sloping position of the evaporator and condenser surfaces, a continuously flowing liquid film can be obtained with the use of minimum means.

The gas to be fed through the openings in the condenser surface will be at a higher temperature than the liquid film on the condenser surface. Furthermore, the liquid which flows off the condenser surface will preferably be at least partially cooled and returned to the condenser surface.

A portion of the liquid which flows off the condenser surface can be removed as product.

The invention also relates to an installation for bringing a gas and a liquid into contact with one another, comprising at least one evaporator surface provided with small openings, means for feeding liquid to one side of the evaporator surface and means for removing liquid at the opposing side of the evaporator surface and means for blowing gas through the openings in the evaporator surface. An installation of this type is disclosed in the above-mentioned FR-A-2298359.

According to the invention this installation is characterised in that the installation comprises at least one condenser surface provided with small openings and means for feeding a liquid to one side of said condenser surface and means for removing liquid at the opposing side and means for passing gas which has flowed through the openings in the evaporator surface through the openings in the condenser surface.

Preferably, there are means for heating liquid to be fed over the evaporator surface, means for blowing gas through the openings in the evaporator surface, means for cooling liquid to be passed over the condenser surface and means for returning the gas which has passed through the openings in the condenser surface 11 to the underside of the evaporator surface.

BRIEF DESCRIPTION OF THE DRAWINGS

The invention will now be explained in more detail with reference to the figures.

FIG. 3 shows, diagrammatically, a practical embodiment of an evaporator/condenser.

FIG. 4 shows, diagrammatically, the use of heating means in an evaporator/condenser according to the invention.

DETAILED DESCRIPTION OF THE INVENTION

Figure 1:
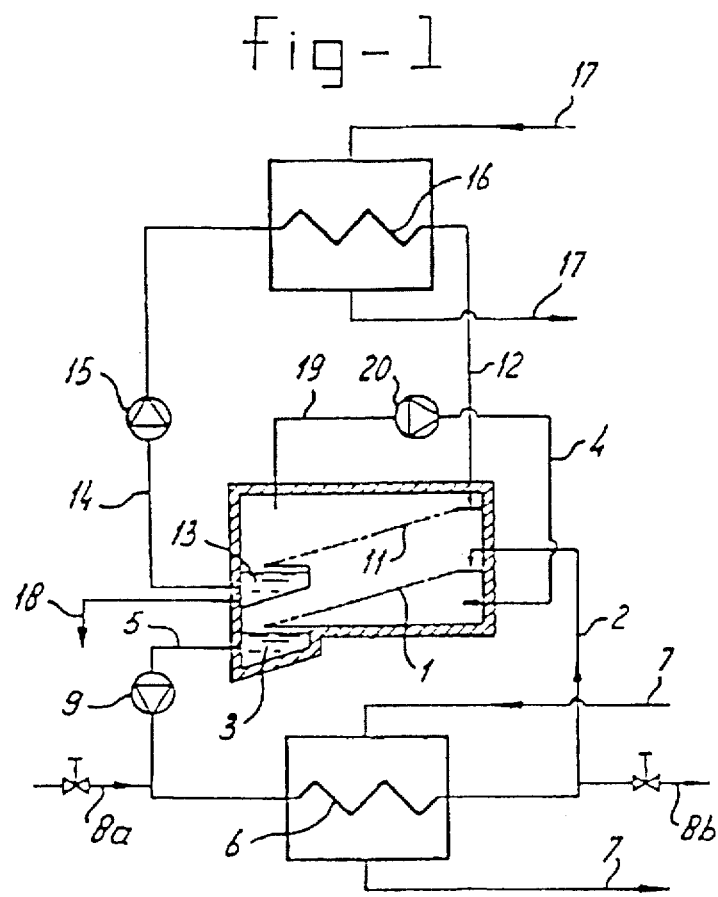
FIG. 1 shows, diagrammatically, an evaporator/condenser.

The diagram according to FIG. 1 illustrates the combination of evaporator and condenser. The evaporator comprises a sloping surface 1, which has openings, a line 2 for supplying liquid to the upper end of the surface 1, a collection channel 3 for liquid dripping from the surface 1, and a gas line 4 for supplying air or another gas under slightly elevated pressure beneath the sloping surface. The liquid line 2 forms part of a circuit comprising a liquid discharge 5, heat exchanger 6 which is heated by circuit 7, a liquid make-up line 8a, a drain line 8b and a circulation pump 9.

The drain line 8b serves to prevent the concentration of impurities in the circuit 2, 1, 3, 5, 9, 6 from being allowed to rise above a certain level.

On supplying liquid (for example water) via the line 2, a liquid film is formed on the evaporator surface 1. The gas (air) flows through the openings in the surface 1 and undergoes intensive mixing with the liquid. Some of the vaporising liquid is absorbed from the liquid. The air above the surface 1 is completely saturated. With the aid of the heat exchanger 6, heated with the aid of the circuit 7, the liquid to be fed onto the surface 1 is heated to a temperature above ambient temperature. The gas supplied via line 4 is cooler than the liquid on the surface 1. In the gas/liquid zone immediately above the surface 1, the gas assumes a temperature which is somewhat below that of the liquid and becomes saturated with vapour. The gas discharged has therefore withdrawn vapour from the liquid. The liquid becomes cooler and, if the liquid contains dissolved impurities or salt, concentration takes place.

Figure 2:
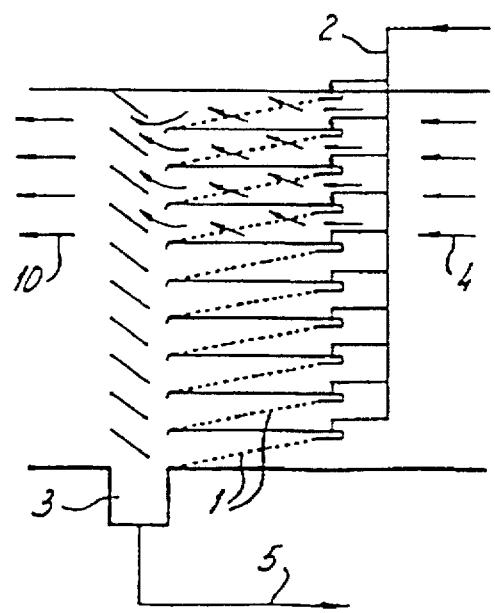
FIG. 2 shows, diagrammatically, a practical embodiment of the evaporator component.

In FIG. 2 a number of sloping evaporation surfaces 1 have been placed above one another. They are supplied with liquid by means of a line 2 which has branches. The installation acts as an evaporator, gas (air) saturated with vapour being discharged at 10. Without topping up, the liquid would concentrate and without heating, the liquid in the circuit would become cooler.

FIG. 1 shows, in addition to a sloping evaporator surface 1, a sloping condenser surface 11, which is located above said evaporator surface 1 and is likewise provided with openings. Liquid is supplied via a line 12 to the upper edge of said surface 11, which liquid gives rise to a flowing liquid film on the surface 11, which film runs off from the lower edge into a reservoir 13. A discharge line 14, provided with pump 15, runs from said reservoir and feeds the liquid to a heat exchanger 16, which is cooled with the aid of the circuit 17. The gas (air) above the evaporator surface 1 flows through the openings in the condenser surface 11. As it flows through, the gas is cooled by the liquid film on the surface 11, as a result of which some of the vapour in the gas condenses and passes into the liquid circuit. The level in the reservoir 13 will rise and liquid can be withdrawn as product by means of the line 18.

For example, the liquid in the evaporator circuit 2, 1, 3, 5, 9, 6 is a dirty, relatively hot industrial effluent stream and the liquid in the condenser circuit 12, 11, 13, 14, 15, 16 is a clean, relatively cold water stream. The quantity of clean water withdrawn via the line 18 therefore originates from the dirty water via the evaporator/condenser method. The evaporator/condenser method is therefore suitable for distillation, desilting or purification of liquid in general.

It can be seen from FIG. 1 that the gas (air) is also in a circuit. The relatively cool gas above the condenser surface 11 is removed by the line 19 and the pump 20 and fed via a line 4 beneath the evaporator surface 1, where it is heated by intensive mixing with the warm liquid film on the surface 1 and is subsequently cooled by intensive mixing with the cold liquid stream on the surface 11.

The method is outstandingly suitable for utilisation of isentropic low-value energy present in industrial cooling water, for example cooling water from power stations which is at a temperature of, for example, 35° C. Said cooling water is fed through the circuit 7, by which means water at normal ambient temperature is brought to a higher temperature via the heat exchanger 6.

If the liquid concerned is water and the gas concerned is air, the method according to the invention can be used at temperatures of from 0° to 100° C. A result is achieved as long as there is a small difference between the temperature of the water passed over the evaporator surface and that of the water passed over the condenser surface.

The essential aspect is that the intensive mixing of liquid and gas is achieved by the liquid flowing over a slope containing holes and gas being blown through said holes.

Relatively little power is needed for the slightly elevated pressure of the gas (for example 10 mm water column) needed to blow gas at a high rate through the liquid films on the evaporator and condenser. Despite the relatively small quantity of vapour (moisture) which gas (air) is able to contain at relatively low temperature, a high production per unit capacity or unit weight of the apparatus can be achieved.

The combination of evaporator and condenser can be used for desilting water, for the purification of drinking water by distillation, for the preparation of distilled water, for the distillation of water to remove chemicals and for the distillation of alcohol.

The invention is also applicable for flue gas treatment units, for removing dust particles from air and for aeration of water; also cooling might be possible.

FIG. 3 shows, diagrammatically, a practical embodiment of an evaporator/condenser.

The evaporator section, which has a number of sloping evaporator surfaces 1, is drawn on the right and the condenser section, which has a number of sloping condenser surfaces 11, is drawn on the left. Furthermore, components which correspond to those in FIG. 2 have been provided with the same reference numerals.

FIG. 4 illustrates, by way of example, the energy and temperature consequences when an evaporator/condenser is used in a horticultural greenhouse heating system.

The reference numerals in FIG. 4 have the following significance:

20=heat-producing boiler,
21=heat-consuming radiator,
22=evaporator/condenser,
23=dirty water circuit,
24=clean water circuit,
25=dirty water/boiler water heat exchanger,
26=clean water/boiler water heat exchanger,
27a=dirty make-up water,
27b=drain line
28=collection of distilled water produced,
$\Delta Q$=the increase in heat content in heat exchanger 25 and the reduction in heat content in heat exchanger 26.

Theoretically, no additional heat has to be generated for the production of, for example, distilled water. In practice, a few losses, such as flue losses, do, of course, occur.

Of course, various modifications and additions are possible within the scope of the invention. For instance, in the case of installations having more evaporator surfaces and more condenser surfaces it is possible to supply gas in series and liquid in parallel, or liquid in series and gas in parallel or liquid and gas in series. It will be clear that in the embodiment shown gas and liquid are supplied in parallel.

I claim:

1. Method for contacting a gas with a liquid, comprising:
   heating a first liquid so as to obtain a heated liquid;
   passing said heated liquid in the form of a film on a number of evaporator surfaces provided with small openings;
   feeding a gas through the openings of said evaporator surfaces, said gas mixing with said heated liquid on said evaporator surfaces to absorb vapour from said heated liquid;
   cooling a second liquid so as to obtain a cooled liquid;
   passing said cooled second liquid in the form of a film over a number of condenser surfaces provided with small openings;
   feeding the gas, which has absorbed vapour from the film of said heated liquid on the evaporator surfaces, through the openings in the condenser surfaces, whereby at least some of the absorbed vapour condenses and is carried along with the film of said second liquid on the condenser surfaces.

2. Method according to claim 1, wherein liquid which flows off the evaporator surfaces is heated and returned to the evaporator surfaces, thereby forming an evaporator circuit.

3. Method according to claim 2, further comprising adding make-up liquid to the first liquid in the evaporator circuit.

4. Method according to claim 1, wherein the evaporator surfaces and the condenser surfaces are sloping.

5. Method according to claim 1, wherein liquid which flows off the condenser surfaces is at least partially cooled and returned to the condenser surfaces.

6. Method according to claim 1, further comprising removing as a product a portion of the second liquid which flows off the condenser surfaces.

7. Installation for contacting a gas with a liquid, comprising:

a plurality of evaporator surfaces provided with small openings;

means for heating a first liquid so as to obtain a heated liquid;

means for feeding said heated liquid to one end of said evaporator surfaces;

means for removing liquid at an opposite end of said evaporator surfaces;

means for blowing gas through said openings in said evaporator surfaces;

a plurality of condenser surfaces provided with small openings;

means for cooling a second liquid so as to obtain a cooled liquid;

means for feeding said cooled liquid to one end of the condenser surfaces;

means for removing liquid at an opposite end of said condenser surfaces; and means for passing gas which has passed through the openings in the evaporator surfaces through the openings in the condenser surfaces.

8. Installation according to claim 7, wherein the evaporator surfaces and the condenser surfaces are sloping.

9. Installation according to claim 7, further comprising means for returning gas which has passed through the openings in a condenser surface to an underside of an evaporator surface.

* * * * *